United States Patent
Goff et al.

[11] Patent Number: 6,105,142
[45] Date of Patent: Aug. 15, 2000

[54] INTELLIGENT POWER MANAGEMENT INTERFACE FOR COMPUTER SYSTEM HARDWARE

[75] Inventors: Lonnie C. Goff; David R. Evoy, both of Tempe; Franklyn Story, Candler; Mark Sullivan, Tempe, all of Ariz.

[73] Assignee: VLSI Technology, Inc., San Jose, Calif.

[21] Appl. No.: 08/799,099

[22] Filed: Feb. 11, 1997

[51] Int. Cl.[7] .................................................... G06F 1/32
[52] U.S. Cl. ........................ 713/324; 713/322; 713/320; 713/323
[58] Field of Search ........................ 395/750.03, 750.06, 395/750.07, 750.08, 828, 830, 836; 364/707

[56] References Cited

U.S. PATENT DOCUMENTS

| | | | |
|---|---|---|---|
| 5,590,342 | 12/1996 | Marisetty | 395/750.03 |
| 5,638,541 | 6/1997 | Sadashivaiah | 395/750.03 |
| 5,675,813 | 10/1997 | Holmdahl | 395/750.03 |
| 5,692,204 | 11/1997 | Rawson et al. | 395/750.06 |
| 5,748,980 | 5/1998 | Lipe et al. | 395/828 |
| 5,765,001 | 6/1998 | Clark et al. | 395/750.08 |

OTHER PUBLICATIONS

Intel Corporation, Microsoft Corporation, Toshiba Corporated; "Advanced Configuration and Power Interface Specification"; —version 0.99; 1996.

*Primary Examiner*—Ayaz R. Sheikh
*Assistant Examiner*—Raymond N Phan
*Attorney, Agent, or Firm*—Wagner, Murabito & Hao LLP

[57] ABSTRACT

A method and apparatus for managing power consumption in a computer system wherein the method and apparatus is compliant with the proposed Advanced Configuration and Power Interface (ACPI) specification. In one embodiment, a power management processor is sandwiched between platform hardware and the ACPI register layer. The processor processes all operating power management commands and requests while remaining transparent to the user and the operating system. In so doing, routine power management functions, so classified by the operating system, are implemented by the operating system. Sophisticated power management features, on the other hand, are implemented by the present invention independent from operating system control. Accordingly, in the present invention, the operating system need not suspend processing of other threads to process sophisticated power management procedures.

10 Claims, 5 Drawing Sheets

INTELLIGENT POWER MANAGEMENT INTERFACE FOR COMPUTER SYSTEM HARDWARE

TECHNICAL FIELD

The present invention relates to power management in computer systems and more particularly to a computer system where the operating system is power management aware.

BACKGROUND ART

Computer systems have evolved over the recent past with technical improvements that have resulted in many new devices or peripherals such as CD-ROMs, portable printers, speakers, color high definition displays and audio sound cards and video adapters becoming widely available. With these devices, together with the enhanced microprocessor at the heart of the computer system, power consumption, or more particularly, power management, has become an issue. Thus it has become common practice to utilize one of several available power management schemes to manage power consumption of the computer system.

Power management schemes have been widely adopted to permit unused devices to be placed into a sleep state even when the computer system is active with one or more tasks. For example, if the computer system is engaged in a word processing application program, the screen and processor will most likely be in active use. However, since the disk drive, CD-ROM, printers and many of the other devices will rarely be activated by the application program, these devices may be placed the sleep state to conserve power. When the application program requires, by way of example, a write or read to disk, the disk drive is awakened and returned to its full operational, and high power, state for the data transfer operation.

In one existing power management scheme, power management has been performed primarily at the device level. With this scheme, power management is independent of the operating system so devices are compatible with a variety of computer systems. Under this scheme, the power state of each device is set by its device driver based on pre-configured profiles determined by the user or by system default states stored in the system Basic Input/Output System (BIOS) memory. When a power state of a device is to be changed, the device driver generates a system interrupt which halts operation of the processor's current task so that new power state data may transferred to the device driver. The change in power state occurs independently of current operating system activity.

System level interrupts, however, suffer from numerous disadvantages. Specifically, system interrupts may cause loss of incoming data during the period when the processor is responding to the interrupt. Loss of data may be merely annoying or may create significant errors if the computer system is unable to process data. By way of example, a universal serial bus (USB) allows the keyboard, modem, CRT display device, mouse and other devices to communicate through a multiplexed serial link that transmits information in one millisecond frames. Since the information is parsed, data may be lost during the time the central processor is responding to a system interrupt because the USB is highly time dependent and cannot tolerate the unknown and unanticipated delay caused by system interrupts.

Further, as operating systems and application programs become more powerful and sophisticated, the decentralized nature of operating system transparent power management makes it difficult to anticipate when the interrupts will occur. Thus, unscheduled interrupts may degrade performance of some application programs.

Further still, decentralized power management complicates the gathering of information relating real-time operational parameters of the computer system so that context-sensitive operating frequency and power levels are selected. For example, if the ambient temperature is high, power may be conserved by reducing the operating frequency and/or the voltage applied to the central processor or other devices if high speed is not necessary.

More recently, certain computer manufacturers and an operating system developer have proposed a specification for evolving power management functions to operating system control. The specification, known as the Advanced Configuration and Power Interface ("ACPI") specifies the interface requirements between devices and the operating system. This interface sets forth the technical standards and requirements so that the operating system controls power management and device configuration as described in the publication: Advanced Configuration and Power Interface ("ACPI"), draft revision 0.99, dated Dec. 16, 1996 and available from Intel Corporation, Toshiba Corp. or Microsoft Corporation, which publication is incorporated herein by reference.

Referring now to Prior Art FIG. 1, an architectural diagram describing the relationship of the software and hardware components of the ACPI interface is shown. The ACPI interface includes five basic components: the operating system kernel 112 (which includes operating system power management software code 114), ACPI dual-ported registers 116, ACPI BIOS 118, ACPI tables 120, and an ACPI driver 122. ACPI driver 122 provides the interface between ACPI registers 116, ACPI BIOS 118, ACPI tables 120, and OSPM system code 114. ACPI registers 116, ACPI BIOS 118, and ACPI tables 120, are coupled to platform hardware 124 which includes, by way of example, a microprocessor, memory, and a plurality of peripherals, or devices, such as disk drives, displays, a keyboard, a mouse etc. As is well understood in the art, operating system kernel 112 interfaces with platform hardware 124 by way of one or more device drivers 126, once platform hardware 124 has been initialized. Initialization data for each device is stored in system BIOS 128 and is automatically transferred to platform hardware 124 and device drivers 126 when power is initially applied to the computer system.

Under the ACPI scheme, power management functions will be controlled by OSPM system code 114. OSPM system code 114 issues commands through ACPI driver 122 and receives information regarding platform hardware operational and power states in return. ACPI tables 120 contain necessary information that permits the operating system to recover details on the configuration of the platform upon power-up initialization. Accordingly, upon initial power-up, ACPI BIOS 118 supplies information from ACPI tables 120 to ACPI driver 122. Based on information held in ACPI registers 116 and the information available to OSPM system code 114, real-time power management of the hardware platform is controlled by operating system kernel 112. In this manner, unanticipated system interrupts of unknown duration are avoided or executed in a controlled manner.

The contemplated architecture, however, suffers from numerous disadvantages. For example, the architecture is not yet completely defined and future changes may negatively impact proper interface of devices designed to function in accordance with preliminary drafts of the specification. Also, since specifications are rarely static, future changes in the specifications will likely require the owner of the computer system to upgrade existing hardware to match or take advantage of any new features that may be later implemented. Still further, legacy devices that currently handle power management functions at the device level are unable to be efficiently interfaced with the ACPI-based operating system kernel 112.

Further, there is only limited provision set forth in the specification by which hardware manufacturers can implement custom power management functions or add features to devices or the microprocessor itself since the ACPI BIOS and ACPI driver control must conform to the published standards. Specifically, the ACPI interface incorporates pseudo-code (often referred to as "P-code") to implement predefined control methods. Since interpretation of P-code is slow and requires the involvement of the central processing unit, it is desirable to provide a mechanism that is independent from the operating system by which innovative power management functions may be added while remaining fully compliant with the ACPI interface standards.

Accordingly, it is desirable to provide a migration path for legacy devices (which utilize system interrupts) to comply with the ACPI interface standards and to add novel power management functions while remaining fully compliant with the ACPI interface standards.

DISCLOSURE OF THE INVENTION

The present invention provides a migration path for legacy devices (which utilize system interrupts) to comply with the ACPI interface standards and to add novel power management functions while remaining fully compliant with the ACPI interface standards.

More specifically, the present invention discloses a method and apparatus for managing power consumption in a computer system that is compliant with the proposed Advanced Configuration and Power Interface (ACPI) specification. In one embodiment, a power management processor is sandwiched between the platform hardware and the ACPI register layer to process all power management events initiated by power management interrupts (i.e. either system management interrupts (SMI) or system control interrupts (SCI)). The processor remains transparent to the user and the operating system while implementing routine power management functions together with sophisticated power management features that may be implemented independent from operating system control.

The processor of the present invention performs complex power management procedures based upon simple and quick stimuli from the ACPI interface. Thus, the operating system need not suspend other threads to process inefficient P-code since power management procedures are off-loaded to the processor. By way of example, the processor may control system voltage and operating frequency based upon the operating temperature of the computer system without operating system knowledge or awareness rather. That is, the processor of the present invention performs the power management procedures rather than utilizing the ACPI mechanisms to implement the change. Additionally, such power management changes to platform hardware parameters are carried out by the processor of the present invention without requiring the computer system's central processing unit to suspend operation of its other tasks.

Another advantage of the present invention is the creation of closed loops which exclude involvement by the operating system. Advantageously, no changes to the operating system are required to implement the closed loops of the present invention. The processor of the present invention traps selected system interrupts and provides the environment in which manufacturers may add proprietary and innovative power management and control schemes independent of the operating system.

In addition to power management, the processor of the present invention may act as an embedded controller for communications between user input devices such as a mouse, un-scanned and scanned keyboards, CD-ROM etc. The processor of the present invention is also well suited for communicating with the universal serial bus (USB) or for implementing real-time clock functions.

Still another advantage of the present invention is the flexibility to adapt to changes that may adopted by the ACPI specification without requiring costly additions or modifications to the devices or other hardware elements of the computer system.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

BEST MODE FOR CARRYING OUT THE INVENTION

Figure 1:
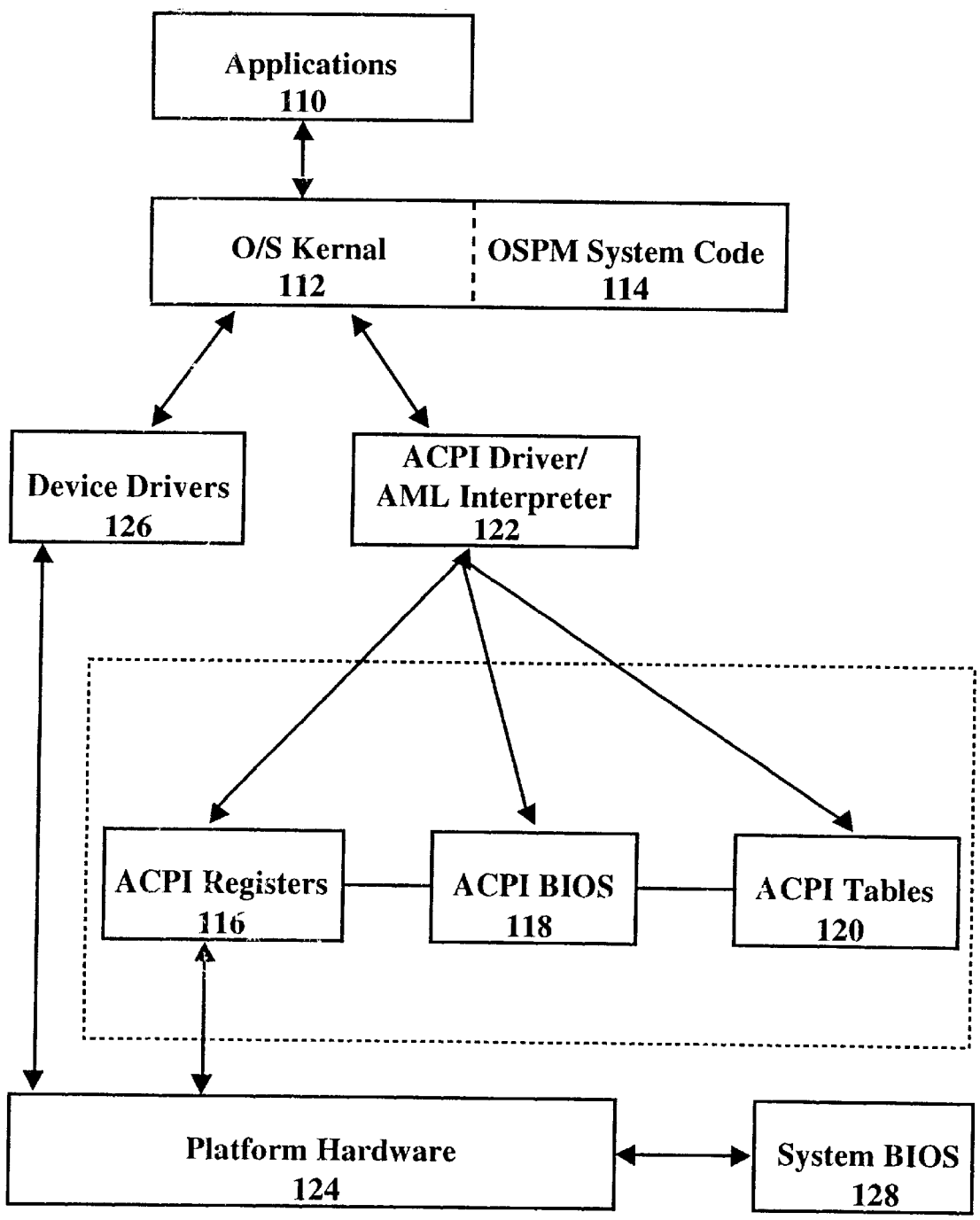
FIG. 1 is an architectural diagram describing the relationship of the software and hardware components of the ACPI interface.

In the following description of the preferred embodiments, reference is made to the accompanying drawings which form a part hereof, and in which is shown, by way of illustration, a specific embodiment in which the invention may be practiced. It is to be understood that other embodiments may be utilized and that changes may be made without departing from the scope of the present invention. For purposes of illustration the following description describes the present invention as used with an operating system with power management capabilities. However, it is contemplated that the present invention can be used as a part of computer systems in conjunction with other operating systems that are not inherently aware of power management functions.

Reference will now be made in detail to the preferred embodiments of the invention, examples of which are illustrated in the accompanying drawings. Wherever possible, the same reference numbers will be used throughout in the drawings to refer to the same or like components.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "collecting", "determining", "operating", "monitoring" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Figure 2:
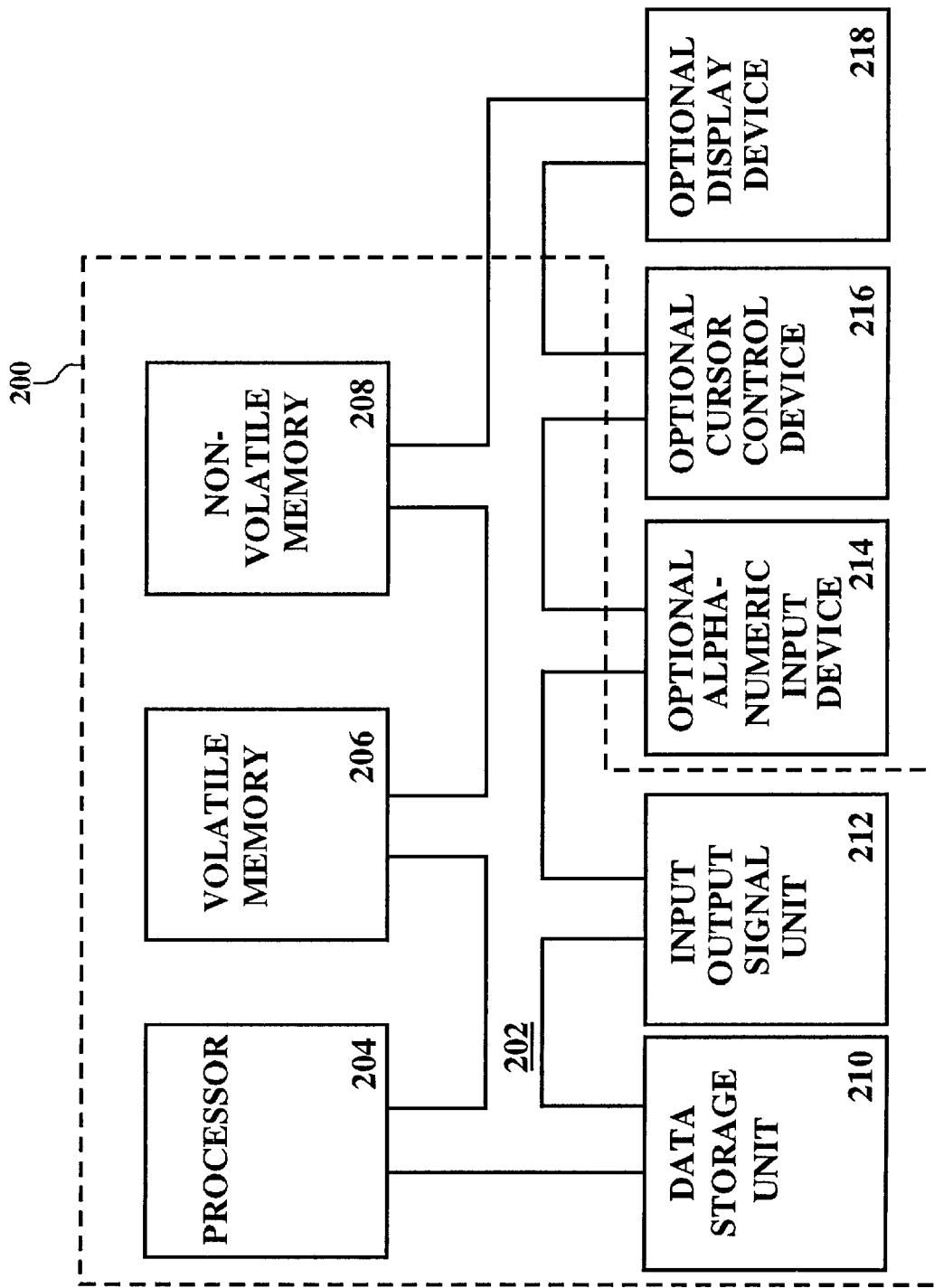
FIG. 2 illustrates an exemplary computer system used as a part of an intelligent power management interface system in accordance with one embodiment of the present invention.

With reference now to FIG. 2, portions of the intelligent power management interface are comprised of computer-readable and computer-executable instructions which reside, for example, in computer-usable media of a computer system. FIG. 2 illustrates an exemplary computer system 200 used as a part of an intelligent power management interface in accordance with one embodiment of the present invention. It is appreciated that system 200 of FIG. 2 is exemplary only and that the present invention can operate within a number of different computer systems including general purpose computers systems, embedded computer systems, and stand alone computer systems specially adapted for sizing server systems.

System 200 of FIG. 2 includes an address/data bus 202 for communicating information, and a central processor unit 204 coupled to bus 202 for processing information and instructions. System 200 also incudes data storage features such as a computer usable volatile memory 206, e.g. random access memory (RAM), coupled to bus 202 for storing information and instructions for central processor unit 204, computer usable non-volatile memory 208, e.g. read only memory (ROM), coupled to bus 202 for storing static information and instructions for the central processor unit 204, and a data storage device 210 (e.g., a magnetic or optical disk and disk drive) coupled to bus 202 for storing information and instructions. A signal input output comm device 212 (e.g. a modem) coupled to bus 202 is also included in system 200 of FIG. 2. System 200 of the present intelligent power management interface also includes an optional alphanumeric input device 214 including alphanumeric and function keys is coupled to bus 202 for communicating information and command selections to central processor unit 204. System 200 also optionally includes a cursor control device 216 coupled to bus 202 for communicating user input information and command selections to central processor unit 204. System 200 of the present embodiment also includes an optional display device 218 coupled to bus 202 for displaying information.

Display device 218 of FIG. 2, utilized with the present intelligent power management interface, may be a liquid crystal device, cathode ray tube, or other display device suitable for creating graphic images and alphanumeric characters recognizable to a user. Optional cursor control device 216 allows the computer user to dynamically signal the two dimensional movement of a visible symbol (cursor) on a display screen of display device 218. Many implementations of cursor control device 216 are known in the art including a trackball, mouse, touch pad, joystick or special keys on alphanumeric input device 214 capable of signaling movement of a given direction or manner of displacement. Alternatively, it will be appreciated that a cursor can be directed and/or activated via input from alphanumeric input device 214 using special keys and key sequence commands. The present invention is also well suited to directing a cursor by other means such as, for example, voice commands. A more detailed discussion of the present intelligent power management interface is found below.

Figure 3:
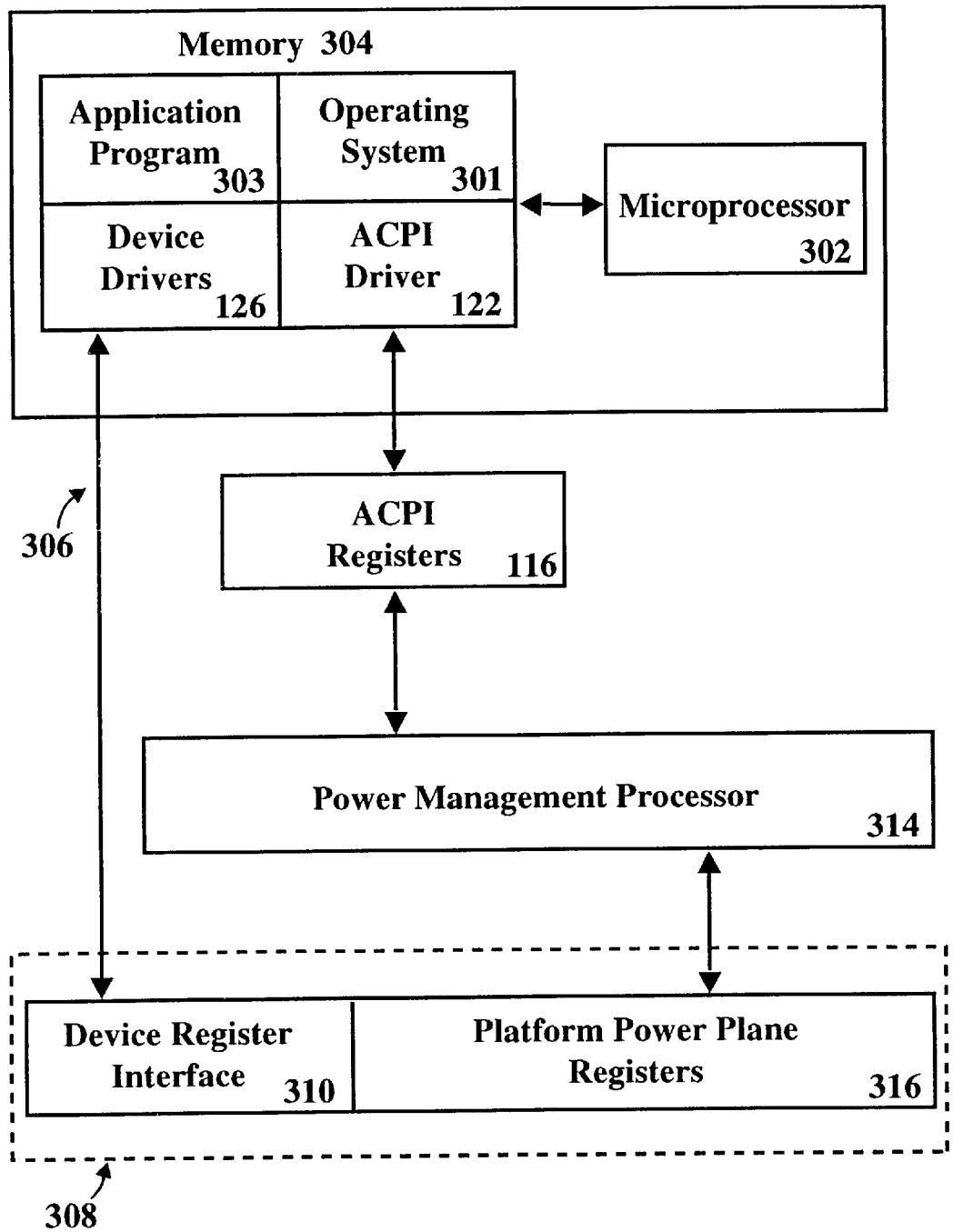
FIG. 3 illustrates the hardware components of an exemplary computer system in accordance with the present claimed invention.

FIG. 3 illustrates the hardware components of an exemplary computer system 300 in which the present invention is used. Computer system 300 includes at least one microprocessor 302 and memory 304 coupled by system bus 306 to a plurality of devices typically shown as 308. Although not specifically shown in FIG. 3 for the sake of clarity, devices 308 may include the following: a display terminal; input devices, such as a keyboard and/or a mouse; sound generating devices; secondary and tertiary storage devices, and the like. As will be appreciated by persons of ordinary skills in the art, the exemplary computer system and the functions performed thereby are not critical to the use of the present invention and that other arrangements of devices and functions may be substituted therefor.

As is well understood in the art, active portions of the operating system 301 and application programs 303 are stored in memory 304 for execution by microprocessor 302 with in-active portions of operating 310 system and application programs 303 stored on a disk drive or other storage devices, not shown. Operating system 301 provides the basic instruction set for controlling microprocessor 302 and for interfacing microprocessor 302 with the plurality of devices 308 in a manner that permits completion of the tasks requested by application programs 303. Application programs 303, by way of example, perform specific functions such as word processing, multimedia applications, or network communications.

Interfaces of operating system 301 determine when application programs 303 will use or require access to a particular device. Operating system 301 then transfers the necessary command, control, and data information to device driver 126 which is loaded in memory 304 upon power-up or system initialization. Device drivers 126 contain basic machine code necessary to control the operation of a corresponding device 308 and provides the interface between device registers 310 and memory 304 for the exchange of data.

To conserve system power consumption, many devices have the capability to switch to a low power "sleep" state.

When a device 308, in the low power state, is accessed by an application program 303, device 308 must be reactivated to its full operational power state. Accordingly, device power states may be defined by the amount of power the device uses when the device is in the sleep state and when fully active and operational. Additional intermediate power states may be further defined based on: 1) operational capabilities of the device (for example, operation at a low or intermediate frequency); 2) the number of steps required to change a device from a low power state to a high power state; and 3) the amount of time it takes to restore the device to a fall power state from a lower power state.

In the present invention, a power management processor 314 interfaces registers 116 to the platform power plane registers 316. In so doing, routine power management functions, so classified by operating system 301, are implemented by operating system 301. Sophisticated power management features, on the other hand are implemented by the present invention independent from operating system control. Accordingly, in the present invention, operating system 301 need not suspend processing of other threads to process sophisticated power management procedures. The ACPI specification defines mechanisms, for communicating with devices 308, which are necessary to change device power states upon detection of a power management event. Examples of power management events are generation of a low battery signal from a smart battery, detection of a modem ring when the computer system is in the sleep mode, or detecting activation of a Suspend/Resume button. Specifically, operating system 301 transfers the necessary command, control and system status information through ACPI driver 122 and ACPI registers 116.

Listed below is a minimum set of ACPI registers 116 for implementing power management processor 314 of the present invention in a manner compatible with the ACPI specification. The ACPI specification requires a PM1 status register. The PM1 status register is a read and writer register which contains status bits reflecting the state of computer system 300. Specifically, the PM1 status register includes: bit TMR_STS, which indicates when an interrupt event has occurred or is pending; and bit BM_STS, which is set whenever a system bus master requests control of the system bus or has control of the bus. The PM1 status register further includes: bit GBL_STS, which indicates when a system control interrupt (SCI) is generated; bit PWRBTN_STS, which is set whenever the power button is pressed to turn power to computer system 300 to the ON-state, or if already on, to the OFF-state; and bit SLPBTN_STS, which places computer system into the sleep state if power is already applied. If computer system 300 is already in the sleep state, an interrupt is generated to wake-up computer system 300. Specifically, bit RTC_STS is set in response to a real time clock generated alarm and, if the RTC_EN bit is set, bit RTC_STS generates a power management event. Additionally, bit WAK_STS is set when computer system 300 is in the sleep state and a wake-up event occurs causing computer system 300 to transition to a working state.

Figure 4:
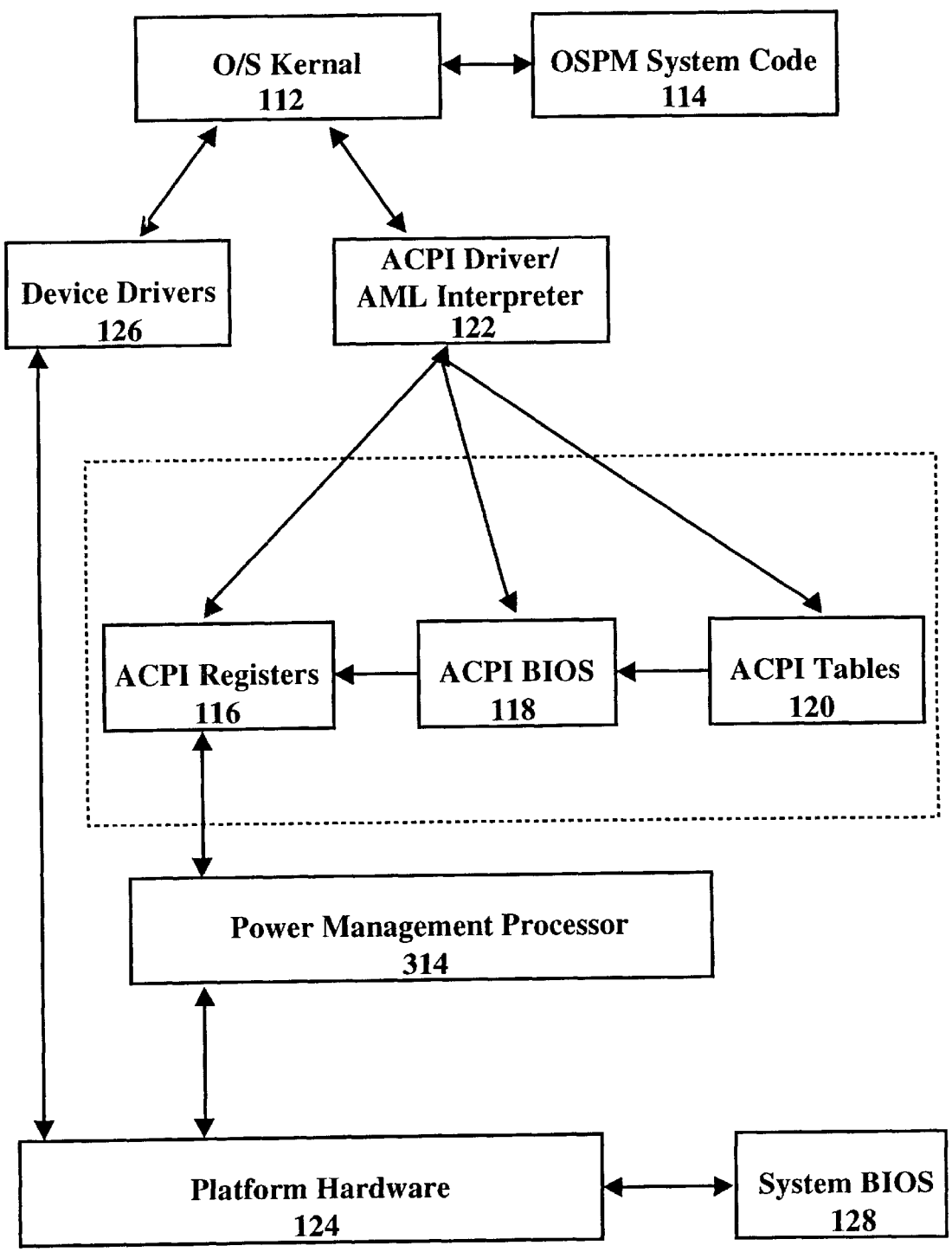
FIG. 4 is an architectural diagram illustrating the relationship of the software and hardware components in accordance with the present claimed invention.

With reference now to FIG. 4, an architectural diagram illustrating the relationship of the software and hardware components in accordance with the present invention is shown. Power management processor 314 of the present invention is also compatible with a PM timer register. The PM timer register returns the current value of a dedicated power management timer which includes either a 24-bit or a 32-bit field countdown timer.

A PM1 control register controls features that may be enabled or disabled. The implementation and configuration details necessary for the operating system to direct power management are stored in the fixed ACPI tables 120. In the preferred embodiment, ACPI tables 120 are stored in the system BIOS 128.

A PM2 control register determines whether microprocessor 302 has control of system bus 306, both of FIG. 3, or whether another device may access the system bus. The 0-bit of the PM2 control register either enables or disables the system arbiter which selects the device that controls the system bus.

A processor control register controls the behavior of the processor clock logic for microprocessor 302 and, in the event there are additional processors, for each such microprocessor. The first four bits (i.e., bits 0–3) define the duty setting of clock throttling hardware. The THT_EN bit enables clock throttling and the CLK_VAL bits reserve locations for clock throttling values.

A processor LVL2 register is a read-only register that generates a request to enter into a C2 power state to the clock control logic where the C2 power state defines an optional ACPI clock state in which microprocessor 302 retains responsibility for maintaining cache coherency but computer system 300 has lower power and higher latency than in the full power state, C1.

A processor LVL3 register is a read- only register that generates a request to enter into a C3 power state to the clock control logic where the C3 power state defines an optional ACPI clock state in which microprocessor 302 is unable to maintain cache coherency. The computer system 300 has lower power and higher exit latency than in the full power state.

A general purpose status registers contain bits that, when set, indicate when a power management event. By asserting one or more bits of the general purpose status register bit, computer system 300 will wake up in response to an event such as a ring indicator, to activity on the USB, or to an system control interrupt (SCI) or system management interrupt (SMI).

Generic registers provide the flexibility to implement functions or devices not otherwise provided for in the ACPI system. The generic registers are accessed by the operating system indirectly using P-code, associated with higher level control methods, to determine the action to be performed. The P-code is made a part of device 308. When a generic event occurs, ACPI driver 122 interprets the P-code and generates control methods to direct the power state of the device 308.

The power plane registers contain information identifying devices that are connected to and powered by a power plane (not shown) associated with computer system 300. If devices are not in use, the ACPI driver 122 removes such devices from the power plane.

Embedded controller registers interface embedded controllers, if any, to microprocessor 302. The controller is accessed by way of an input/output port (not shown) which allows bi-directional data transfers between the controller and microprocessor 302. A command and status port (not shown) returns port status information upon a "read" operation and generates a command sequence to the embedded controller upon a "write" operation.

Referring still to FIG. 4, the existing architectural structure of the ACPI interface of FIG. 1, is retained and the embodiment of FIG. 4, including the present power management processor 314, remains fully compatible and compliant with the ACPI specification.

Power management processor 314 monitors all commands or data directed to registers 116 from ACPI driver 122, ACPI BIOS 118, or ACPI tables 120. Power management processor 314 then analyzes the commands and data and determines the appropriate power states for platform hardware 124. Power management processor 314 of the present invention directly interfaces with various controls, controllers and sensors and status indicators for the power plane controls, clock division control, temperature sensor, voltage control, frequency control, battery controller, real time clock, power button, USB, embedded controllers, dock status, PLL controller and lid status indicators (not shown).

Power management processor 314 of the present invention provides an additional layer of intelligence that simplifies the construction of the ACPI tables, with the included P-code power management instructions, across various combinations of computer and operating system platforms. Power management processor 314 will perform the complex power management procedures based upon simple and quick stimuli from microprocessor 302 of FIG. 3, thereby effectively off-loading the P-code overhead otherwise handled by microprocessor 302 in the prior art embodiment. Further, power management processor 314 of the present invention creates closed loops which do not include the operating system in performing power management. Power management processor 314 further provides the environment by which manufacturers of devices may add proprietary and innovative power control schemes without requiring calls to, or support of, the operating system. Adopting to new standards is facilitated by making software modifications at the intelligence layer of power management processor 314 rather than requiring replacement of the device.

In operation, power management processor 314 of the present invention qualifies the type of power management interrupt to be generated based upon the content of the system control interrupt enable (SCI_EN). If the SCI_EN bit is set, a system control interrupt is generated. If the bit is not set, a system management interrupt (SMI) is generated. When the SCI_EN bit is reset, a SMI handler is active. The SMI handler and power management processor 314 interface with ACPI hardware registers 116 to offload work to power management processor 314 that would otherwise require microprocessor 302 to respond to SCI requests. As will be appreciated, the SMI handler will be unable to gain control of microprocessor 302 in the present embodiment and circumvent operating system control of computer system 300 resulting in an efficient SMI directed power management scheme.

When power management processor 314 of the present invention detects a power button depression, the power button status (PWRBTN_STS) flag is set and the power button enable (PWRBTN_EN) flag is sampled. If the PWRBTN_EN bit is set and computer system 300 is in the sleep state, power management processor 314 executes a sequence of events to "resume" operation. If, however, the computer system is already in the working state when the power button is detected, power management processor 314 generates either a SCI or SMI interrupt based upon the content of the SCI_EN bit. Power management processor 314 performs the power button de-bounce and directly interfaces to the un-scanned keyboard in a portable PC to microprocessor 302. It is to be understood that a key on the keyboard or other user input device may emulate the power button.

When the power button is held down for four (4) seconds it indicates that the operator wants the machine shut off. A hardware state machine performs this shutdown. If the power button override enable (PWRBTNOR_EN) is set when power management processor 314 detects that the Power button has been depressed for more than four (4) seconds, power management processor 314 will set the Power button override status (PWRBTNOR_EN) flag while resetting the PWRBTN_STS flag. Power management processor 314 may shorten or lengthen the standard four (4) second time-out based upon user preference. Power management processor 314 would replace this hardware state machine (i.e. provide a programmable shutdown sequence) and would also allow the four second override to be adjustable (some operators might want one (1) second or ten (10) seconds).

The wake-up status (WAK_STS) flag is set by power management processor 314 when a resume event is detected. Such events include detection of the depression of the power button, ring indicator, lid status or other event where operation of the computer system may need to be resumed from the sleep state. The WAK_STS bit is intended to start a resume state machine, which is often implemented as a silicon controller with independent timers and dedicated inputs and outputs, to return the computer system to a fully operational state. Power management processor 314 replaces this state machine, with a sophisticated and flexible software power sequence that is readily modified.

The real-time clock status (RTC_STS) flag is set by power management processor 314 when a real time clock generates an alarm. Since power management processor 314 may include a plurality of sophisticated real time clocks constructed in software, the number, type and duration of alarms becomes open ended. The advantage is that the computer system may be readily adapted to control household appliances or to control industrial processes without overloading microprocessor 302 of the computer system.

If the real time clock enable (RTC_EN) is set when power management processor 314 generates a real time clock alarm, a power management event will be generated so that the computer system is returned to the wake state, if it was previously in the sleep mode, or a power management interrupt is generated if an application program is to be run under control of microprocessor 302.

Power management processor 314 will perform the necessary sequence of events to put the computer system into the state selected by the sleep type (SLP_TYP) field when it detects sleep enable (SLP_EN) flag. Power management processor 314 replaces complex state machines which perform the necessary suspend sequence when the computer system is to enter the sleep mode. If a suspend sequence needs to be changed, power management processor 314 software may be readily modified whereas a hardwired state machine would require costly and time consuming replacement of the state machine.

Additionally, power management processor 314 monitors the throttle duty cycle (THTL_DTY) field of the computer system. Power management processor 314 of the present invention uses the information to adjust the operating performance of the computer system's performance by using either clock division emulation or a processor frequency scaling mechanism to adjust operating clock rate of the computer system. In addition to adjusting the duty cycle, power management processor 314 may also adjust the voltage applied to the microprocessor 302. Power management processor 314 may also monitor the system battery when computer system 300 is operating under battery power, and ignore the contents of the field if the throttle request from OSPM system code 114 will drain the battery at the requested rate.

In the present embodiment, power management processor 314 may also reduce the clock frequency and the power applied to microprocessor 302 by a pre-selected fixed amount when the low power (LVL2) state is detected. The LVL2 register is a read-only register which is set in operation by microprocessor 302. Power management processor 314 performs the level two power sequence and resets the LVL2 register bit.

Power management processor 314 reduces the clock frequency and the power to microprocessor 302 by a second pre-selected fixed amount when the low power (LVL3) state is detected. As with the LVL2 register, LVL3 register is a read-only register that is set by operation by microprocessor 302. Power management processor 314 of the present invention also performs the level three power sequence and resets the LVL3 register.

When operation of power management processor 314 is suspended and the modem sets the ring indicator status (RI_STS), power management processor 314 will resume operation without waiting for instructions through the ACPI register layer. If the ring indicator enable (RI_EN) bit is also set when the ring indicator is asserted, a power management event will occur and computer system 300 will transistion to the appropriate power state. For example, a wake-up interrupt is generated by power management processor 314 if computer system 300 is asleep or, alternatively, a power management interrupt is generated if computer system 300 is already awake and in a working state.

When the universal serial bus enable (USB_EN) bit is set and a universal serial bus status (USB_STS) flag is detected, a power management interrupt will occur (i.e. the power state of computer system 300 will be transitioned to a working state or a power management interrupt will be generated). Since power management processor 314 is the also the USB controller, more intelligent decisions may be made with regard as to what constitutes a USB power event. In so doing, the present invention reduces or eliminates the generation of unnecessary system events. Further, as both USB and ACPI specifications and hardware evolve, the definition of a power event may be modified at the intelligence level of the present power management processor 314 without hardware modifications.

When the embedded controller enable (EC_EN) bit is set and the embedded controller status (EC_STS) flag is set by either power management processor 314 or microprocessor 302, a power management event will occur. In such a case, power management processor 314 will either wake up computer system 300, if it is in a suspended or sleep mode, or generate a power management interrupt. If the embedded controller's principle function is to detect keystrokes from a keyboard input device it will interpret the key and transfers the information to microprocessor 302 whenever a keystroke is detected. If no key strokes are detected within a selected time period, the embedded controller is suspended until the next key stroke is detected. However, rather than generating a power management event (i.e., generating an interrupt that must be processed by microprocessor 302 and system code 114) every time a slow typist makes a keystroke, power management processor 314 intercepts the interrupt and activates the embedded controller without interrupting microprocessor 302. Further, since power management processor 314 of the present invention comprises the embedded controller, more intelligent decisions may be made with regard as to what constitutes an embedded controller power management event and reduce the generation of unnecessary system events. For example, if a laptop or portable computer is operating under battery power with microprocessor 302 suspended, the user may perform a selected sequence of keystrokes to display battery capacity on the display screen without generating a system interrupt that would require activating the microprocessor's high power state. In this example, power management processor 314 traps the key sequence and displays the battery capacity on the display screen.

Power management processor 314 may be programmed to handle multiple docking strategies (e.g., interfacing a portable computer with a desk top docking station so that the portable is no longer running under battery power) without impacting operating system power manager. Specifically, if power management processor 314 is suspended when the DOCK# signal is asserted, power management processor 314 will automatically resume execution. Power management processor 314 sets the dock status (DOCK_STS) bit and generates a power management event if the dock enable (DOCK_EN) flag is set.

If power management processor 314 is suspended when a STSCHG# signal is asserted, power management processor 314 will automatically resume execution. Power management processor 314 sets the PCMCIA status (STSCHG_STS) bit and generates a power management event if the PCMCIA enable (STSCHG_EN) flag is set. Accordingly, computer system 300 returns to the operating state if operation is suspended or power management processor 314 will generate a power management interrupt.

If power management processor 314 is suspended when, for example, the lid of a laptop computer is opened or closed, power management processor 314 will automatically resume execution. Power management processor 314 sets the lid status (LID_STS) bit and generates a power management event if the lid enable (LID_EN) flag is set. Accordingly, the computer system is returned to the operating state by power management processor 314 of the present invention if operation of the computer system is suspended or power management processor 314 will generate a power management interrupt. Power management processor 314 de-bounces the switch that indicates the lid of computer system 300 has been either opened or closed to thereby minimize generation of power management events transmitted to microprocessor 302. Power management processor 314 may also emulate lid activity based upon input from a motion sensor which detects hand activity near the keyboard.

For ACPI functions not listed above, no intervention by power management processor 314 is believed necessary or desirable. However, one skilled in the art will readily recognize that the embodiment described herein may be changed to provide enhancements or improvements to such functions upon modification of software code of power management processor 314.

Figure 5:
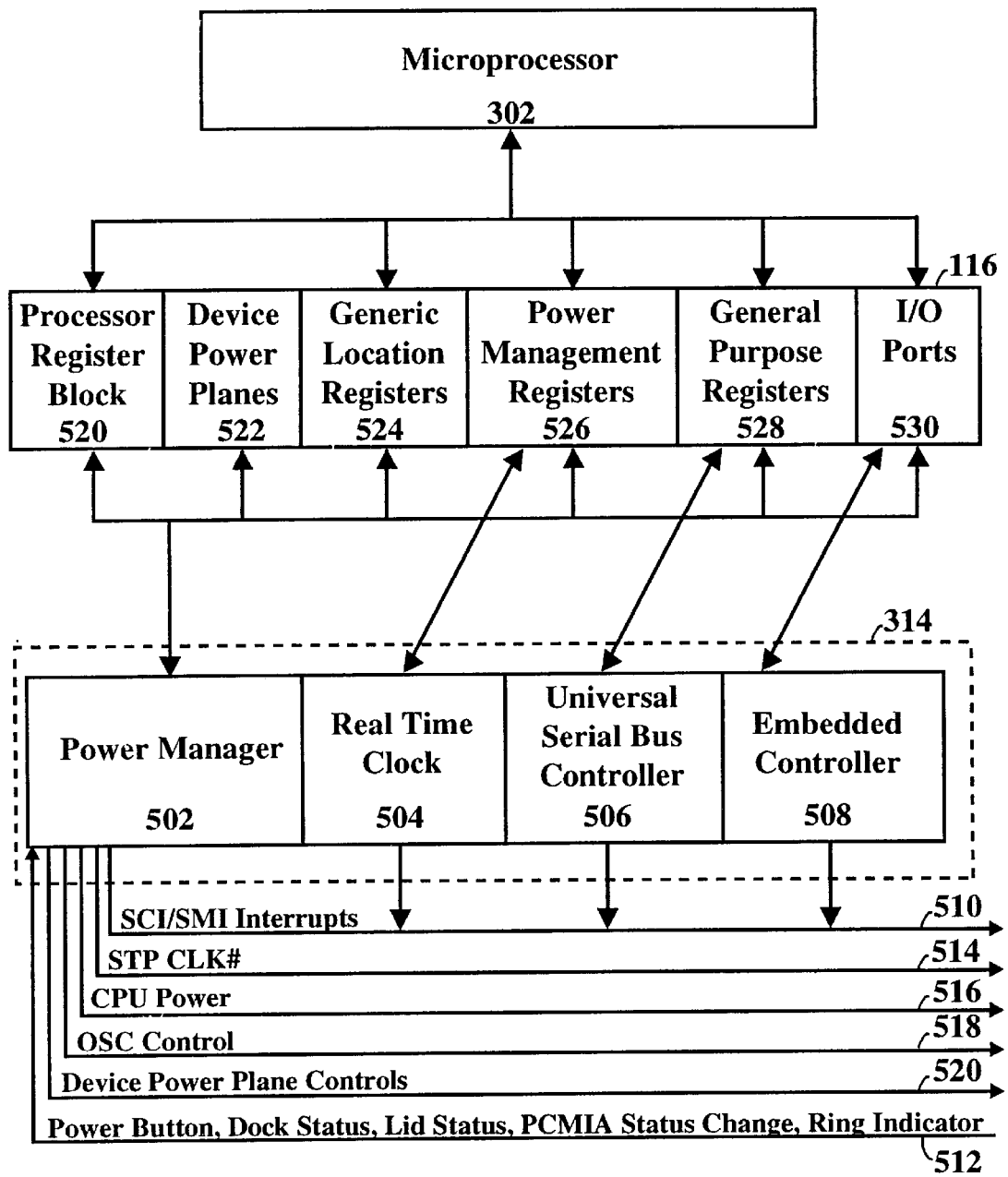
FIG. 5 is a functional block diagram illustrating the interface between the host microprocessor, the ACPI registers, and a power management processor in accordance with the present claimed invention.

Referring now to FIG. 5, a functional block diagram illustrating the interface between host microprocessor 302, ACPI registers 116, and the present power management processor of the present invention is shown. FIG. 5 shows the relationship of power management processor 314 with the platform hardware 124 in greater detail. Power management processor 314 of the present invention includes a power manager 502 which generates SCI or SMI interrupts on line 510 in response to status changes or events provided on line 512 that require computer system to wake-up. When a hardware timer is to be stopped, the appropriate command is transmitted on line 514. Power levels to microprocessor 302 may be adjusted by control signals on line 516. In cases where power may be conserved by lowering the operating rate, the system oscillator may be divided by control signals on line 518. The power planes which provide power to devices 208 may be scaled based on the activity level of the devices as indicated by control signals on line 520.

In one embodiment, power management processor 314 further includes three additional functional blocks, specifically, real-time clocks 504, which can generate periodic, update-completed or alarm interrupts, a USB controller 506 which handles bus communication, and an embedded controller 508 which is used primarily to communicate with the keyboard, mouse and other I/O devices. Each functional block may independently generate an interrupt on line 510. As will be appreciated, power management processor 314 incorporates the function of power management, I/O communication, real-time clocks and USB controller in a single microprocessor device.

Power management processor 314 further communicates with ACPI registers 116 through power manager 502 which is coupled to the various registers. Specifically, power manager 502 is coupled a processor register block 520, device power plane 522, generic registers 524, power management registers 526, and controller I/O ports 530. Real-time clock 504, USB controller 506, and embedded controller 508, have parallel communication connections to power management registers 526, general purpose registers 528, and controller I/O ports, respectively. Additionally, power management processor 314 has indirect access to microprocessor 302 through ACPI register 116.

The power plane functions associated with the various devices have not been summarized above. However, since power management processor 314 adds another level of intelligence to the control of each device's power, reset, suspend, resume, and isolation signal, the computer system is readily adaptable to evolve with the ACPI and USB standards and to interface computer system 300 to legacy devices without hardware modification.

Further, one skilled in the art will readily appreciate that the actual steps necessary to resume the machine from a suspended or sleep state have not been detailed since such steps or sequences are dependent on the computer system. However, it is intended that power management processor 314 will include input and output (I/O) controls to turn power on and off to computer system 300 as well as to start and stop the system oscillators. The timing and sequence of such I/O controls is also dependent on the computer system.

The present invention may be utilized without restriction as to the type of microprocessor used as power management processor 314. In particular, power management processor 314 may be an 8-bit processor such as an Intel 8086 by Intel Corporation of Santa Clara, Calif., or a Motorola 6800 microprocessor by Motorola Corporation of Schaumberg, Ill., or a powerful 32-bit or 64-bit, reduced instruction set command (RISC) based microprocessor where the choice of processors is primarily dependent upon the amount of non-power management related functions that are to be supported by power management processor 314.

There are many operating systems available for use on a computer system, many of which do not include extensive power management functions. Accordingly, the present invention affords an economical means for interfacing devices, with varying levels of power management features or functions, with the operating system.

In the present invention, routine power management functions, so classified by the operating system, are implemented by the operating system. Sophisticated power management features, on the other hand, are implemented by the present invention independent from operating system control. Accordingly, in the present invention, the operating system need not suspend processing of other threads to process sophisticated power management procedures.

Thus, the present invention provides a migration path for legacy devices (which utilize system interrupts) to comply with the ACPI interface standards and to add novel power management functions while remaining fully compliant with the ACPI interface standards.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to the person of ordinary skill in the art without departing from the spirit and scope of the invention as claimed.

We claim:

1. A method of operating a computer system having a central processor and a plurality of devices and an operating system, that is power management aware, so as to minimize power consumption responsive to usage patterns, the method comprising the steps of:

operating said computer system under the control of said operating system;

determining a current state of use of said computer system by the central processor;

responsive to said determining step, operating an ACPI compliant power management processor to selectively change a power state of inactive ones of said plurality of devices, including said central processor, from an active power state to a low power state;

monitoring a state of use of said plurality of devices with said ACPI compliant power management processor to change a power state of selected ones of said plurality of devices, including said central processor, from a low power state to an active power state responsive to use;

communicating the power state of said plurality of devices, including said central processor, to said operating system;

analyzing commands and data directed to ACPI registers from ACPI drivers and determining an appropriate power state for platform hardware; and performing complex power management procedures based on quick and simple stimuli from the central processor.

2. The method of claim 1 wherein said steps of determining and monitoring are carried out substantially independently from said central processor and said operating system so as to minimize use of said central processor to adjust the power states of said devices in response to system usage.

3. The method of claim 1 wherein said monitoring step further includes the step of monitoring a plurality of clocks to control devices without intervention of said central processor.

4. A computer system comprising:

a host microprocessor;

at least one device;

memory, said memory storing an operating system that, in conjunction with said host microprocessor, controls operation of said computer system and device-specific driver code for controlling operation of said at least one device under control of said operating system and said host microprocessor;

an ACPI compliant register linked to said host microprocessor for configuring a power state status of said at least one device under control of said operating system; and an ACPI compliant power management processor linked to said ACPI compliant register and to said at least one device for managing said power state status of said at least one device individually with respect to a power state status of a balance of said computer system, said ACPI compliant power management processor structured to set said power state status of said at least one device individually in response to operating system requests and to change said power state status of said at least one device in response to requests from said at least one device without intervention by said host microprocessor, said ACPI compliant power management processor having a plurality of real time clocks that may be set to control household appliances without intervention of said host microprocessor.

5. The computer system recited in claim 4 wherein said ACPI compliant power management processor comprises a microprocessor.

6. The computer system recited in claim 4 wherein said ACPI compliant power management processor further includes a bus controller and at least one embedded controller coupled to said ACPI compliant register and to said at least one device.

7. A method of operating a computer system having a central processor and a plurality of devices and an operating system that is power-management aware so as to minimize power consumption responsive to usage patterns, the method comprising the steps of:

operating said computer system under the control of said operating system;

determining a current state of use of said computer system substantially independent from said central processor and said operating system so as to minimize the use of said central processor to adjust a power state for each of said plurality of devices in response to system usage;

responsive to said determining step, operating an ACPI compliant power management processor to selectively change said power state of inactive ones of said plurality of devices, including said central processor, from an active power state to a low power state;

monitoring a state of use of each of said plurality of devices with said ACPI compliant power management processor substantially independent from said central processor and said operating system so as to minimize the use of said central processor to change said power state of selected ones of said plurality of devices, including said central processor, from said low power state to said active power state responsive to said state of use; and communicating said power state of each of said plurality of devices, including said central processor, to said operating system.

8. The method of operating a computer system as recited in claim 7, further comprising the step of:

monitoring a plurality of clocks to control devices without intervention of said central processor.

9. A method of operating a computer system, having a central processor and a plurality of devices and an operating system, that is power management aware, so as to minimize power consumption responsive to usage patterns, the method comprising the steps of:

operating said computer system under the control of said operating system;

determining a current state of use of said computer system by the central processor;

responsive to said determining step, operating an ACPI compliant power management processor to selectively change a power state of inactive ones of said plurality of devices, including said central processor, from an active power state to a low power state;

monitoring a state of use of each of said plurality of devices with said ACPI compliant power management processor to change a power state of selected ones of said plurality of devices, including said central processor, from a low power state to an active power state responsive to said state of use;

communicating the power state of said plurality of devices, including said central processor, to said operating system; and monitoring a plurality of clocks to control devices without intervention of said central processor.

10. The method of operating a computer system as recited in claim 9, wherein said steps of determining and monitoring are carried out substantially independent from said central processor and said operating system so as to minimize use of said central processor to adjust the power states of said devices in response to system usage.

* * * * *